US012639940B2

(12) United States Patent
Wang et al.

(10) Patent No.: US 12,639,940 B2
(45) Date of Patent: May 26, 2026

(54) TARGET IDENTIFICATION METHOD, DEVICE AND COMPUTER-READABLE STORAGE MEDIUM

(71) Applicant: UBTECH ROBOTICS CORP LTD, Shenzhen (CN)

(72) Inventors: Kan Wang, Shenzhen (CN); Jianxin Pang, Shenzhen (CN); Huan Tan, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 283 days.

(21) Appl. No.: 18/536,289

(22) Filed: Dec. 12, 2023

(65) Prior Publication Data

US 2024/0193930 A1 Jun. 13, 2024

(51) Int. Cl.
*G06V 10/00* (2022.01)
*G06V 10/77* (2022.01)
*G06V 10/82* (2022.01)

(52) U.S. Cl.
CPC .......... *G06V 10/82* (2022.01); *G06V 10/7715* (2022.01)

(58) Field of Classification Search
CPC ........... G06N 3/02; G06N 3/08; G06N 3/042; G06N 3/045; G06N 3/047; G06N 3/082; G06N 3/092; G06N 3/0475; G06N 3/0454; G06N 3/0464; G06V 10/82; G06V 10/761; G06V 10/762; G06V 10/764; G06V 10/765; G06V 10/85; G06V 10/7715; G06V 10/771
See application file for complete search history.

(56) References Cited

U.S. PATENT DOCUMENTS

| | | | | |
|---|---|---|---|---|
| 9,129,190 B1 * | 9/2015 | Ranzato | ................. | G06V 10/82 |
| 10,930,301 B1 * | 2/2021 | Lumezanu | ............. | G06N 3/084 |
| 10,963,674 B2 * | 3/2021 | Tan | ........................ | G06F 18/214 |
| 11,294,953 B2 * | 4/2022 | Yang | ................... | G06F 16/5854 |
| 11,449,717 B2 * | 9/2022 | Zhang | ...................... | G06N 3/09 |

(Continued)

FOREIGN PATENT DOCUMENTS

CN 110188225 A 8/2019

OTHER PUBLICATIONS

Shijing et al., CN113780243A Training method and device of pedestrian image identification model, apparatus and storage medium; Publication CN113780243A—Dec. 10, 2021.*

(Continued)

*Primary Examiner* — Amir Alavi

(57) ABSTRACT

A target identification method includes: obtaining an image containing a target to be identified; performing feature extraction on the image to obtain image features in the image; and inputting the image features into a target identification network model to obtain an identification result that determines a class to which the target to be identified belongs. The target recognition network model includes a loss function that is to constrain a first distance corresponding to each triplet in a number of triplets and a second distance corresponding to each triplet in the triplets. The first distance represents a distance between anchor image features and positive sample image features in each triplet in the triplets, and the second distance represents a distance between the anchor image features and a class center mean of a number of classes in each triplet in the triplets.

20 Claims, 6 Drawing Sheets

(56) References Cited

U.S. PATENT DOCUMENTS

| 11,594,058 B2 * | 2/2023 | James | G06F 18/2413 |
| 11,729,210 B2 * | 8/2023 | Vasseur | G06N 3/088 |
| | | | 726/22 |
| 12,323,461 B2 * | 6/2025 | Costa | H04L 63/1483 |
| 2019/0034497 A1 * | 1/2019 | Song | G06F 16/248 |
| 2024/0193930 A1 * | 6/2024 | Wang | G06V 10/764 |

OTHER PUBLICATIONS

Ling-yu et al., "CN 106897390 A Target Accurate Search Method Based On Depth Metric Learning ", date published Jun. 27, 2017.*

* cited by examiner

S201

Obtain an image containing a target to be identified

S202

Perform feature extraction on the image to obtain image features in the image

S203

Input the image features into a target identification network model to obtain an identification result that determines a category to which the target to be identified belongs.

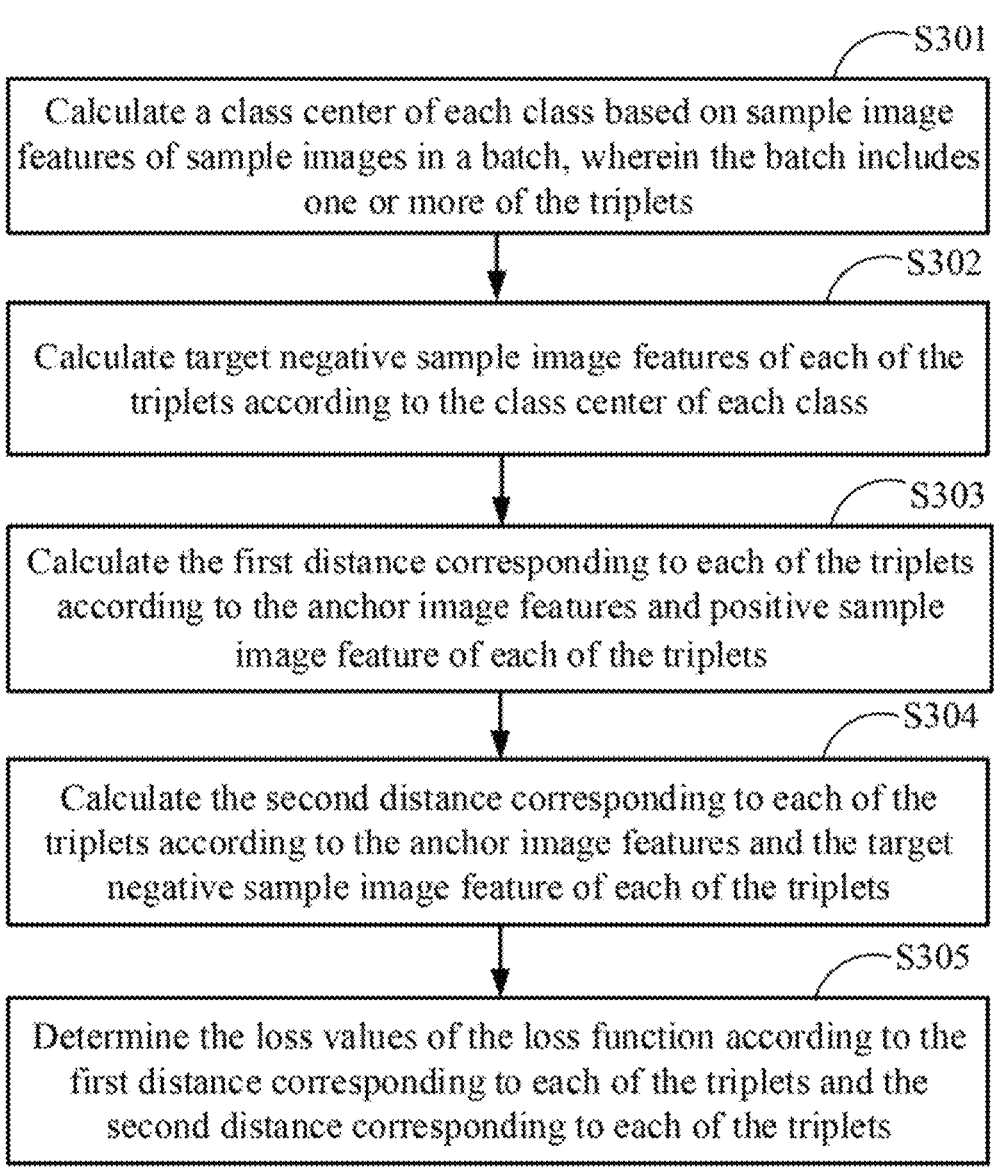

S301

Calculate a class center of each class based on sample image features of sample images in a batch, wherein the batch includes one or more of the triplets

S302

Calculate target negative sample image features of each of the triplets according to the class center of each class

S303

Calculate the first distance corresponding to each of the triplets according to the anchor image features and positive sample image feature of each of the triplets

S304

Calculate the second distance corresponding to each of the triplets according to the anchor image features and the target negative sample image feature of each of the triplets

S305

Determine the loss values of the loss function according to the first distance corresponding to each of the triplets and the second distance corresponding to each of the triplets

FIG. 4

TARGET IDENTIFICATION METHOD, DEVICE AND COMPUTER-READABLE STORAGE MEDIUM

CROSS REFERENCE TO RELATED APPLICATIONS

This application claims priority to Chinese Patent Application No. CN 202211604437.7, filed Dec. 13, 2022, which is hereby incorporated by reference herein as if set forth in its entirety.

TECHNICAL FIELD

The present disclosure generally relates to image-based identification technology, and in particular relates to a target identification method, device and computer-readable storage medium.

BACKGROUND

Target identification is an important application field of computer vision technology. Generally, network models based on deep learning are often used to achieve target identification. The loss function is one of the important parts of the network model. The network models usually take data as input and performs model training by minimizing the loss function. The aim is to minimize the error between the predicted values by the network models and the actual values corresponding to the data, thereby optimizing the network model.

In some conventional technologies, the triplet loss function is commonly used for model training. The optimization direction of the triplet loss function tends to be affected by the features of the sample images and their labels within the triplets, which can result in models trained using the triplet loss function being inaccurate in target identification.

Therefore, there is a need to provide a target identification method to overcome the above-mentioned problem.

BRIEF DESCRIPTION OF DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

FIG. 4 is an exemplary flowchart of a method for calculating the loss value according to one embodiment.

DETAILED DESCRIPTION

Figure 1:
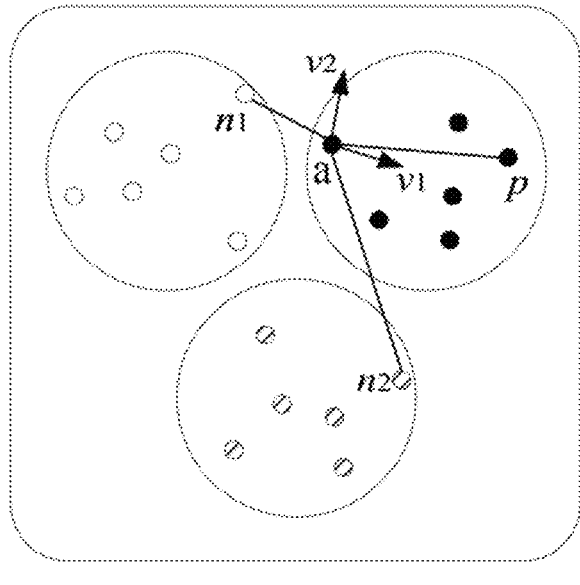
FIG. 1 is a schematic diagram of a conventional model training based on the cross-entropy loss function

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

In some conventional technologies, a cross-entropy loss function is usually used for model training. The triplet loss function is one of the most common loss functions and is often used in visual tasks such as face recognition and person re-identification. Its primary function is to increase intra-class similarity while reducing inter-class similarity. The input of the triplet loss function is a triplet $\{f^a, f^p, f^n\}$ of image features, and its equation is as follows:

$$L_{triplet} = \frac{1}{N_{tp}} \sum_{i=1}^{N_{tp}} \{D(f_i^a, f_i^p) - D(f_i^a, f_i^n) + \alpha\}_+,$$

where $f^a$, $f^p$, and $f^n$ respectively represent anchor image features, positive sample image features, and negative sample image features in a triplet. Positive sample image features are image features of the same class as the anchor image features, and negative sample image features are image features that are of a different class from the anchor image features. $N_{tp}$ is the total number of the triplets in a batch. $\{x\}_+$ represents the maximum value between x and 0, that is, $\{x\}_+ = \max\{x, 0\}$. During the model optimization phase, the triplet loss function constrains the difference between the distance $$D(f_i^a, f_i^p)$$

of the anchor image features and positive sample image features and the distance $$D(f_i^a, f_i^n)$$

of the anchor image features and negative sample image features to be greater than a threshold $\alpha$. As a result, the optimization goal of increasing the intra-class similarity of image features within the same class and reducing the inter-class similarity between image features of different classes is achieved.

The original triplet loss function often uses all triplets to train the model, and its computational complexity is $O(N^3)$, where N is the number of images in a training data set. In order to improve the training efficiency of the model, some related technologies use the "hard example mining" strategy to select "effective" triplets. As shown below, the equation of the triplet loss function based on hard example mining can be expressed as:

$$L_{triplet} = \frac{1}{N_{tp}} \sum_{i=1}^{P} \sum_{i=1}^{A} \left\{ \max_{p=1...A} D(f_i^a, f_i^p) - \min_{\substack{n=1...A \\ j=1...P \\ j \neq i}} D(f_i^a, f_j^n) + \alpha \right\}_+,$$

where P is the total number of classes of targets in a batch, and A is the number of sample images of each target (such as pedestrians) in a batch. max( ) is a function that returns the largest of two or more values, and min( ) is a function that returns the smallest of two or more values.

In practical applications, it is found that the optimization direction of the triplet loss function tends to be affected by the features and labels of the sample images in the triplets.

Specifically, referring to FIG. 1, circles filled with solid colors, circles filled with diagonal lines, and hollow circles respectively represent sample image features of targets of different classes. In the figure, a and p represent the anchor image feature and positive sample image feature, respectively. $n_1$ and $n_2$ represent negative sample image features of different classes. $v_1$ and $v_2$ respectively represent the optimization direction of the anchor image feature a when $n_1$ and $n_2$ are used as negative sample image features.

As can be seen from FIG. 1, $v_1$ and $v_2$ are obviously different, which will lead to an unstable optimization direction when optimizing the anchor image feature a. Specifically, when $n_1$ is selected as the negative sample image feature, the conventional triplet loss function optimizes the anchor image feature a toward the upper right of FIG. 1. When $n_2$ is selected as the negative sample image feature, the conventional triplet loss function optimizes the anchor image feature a toward the lower right of FIG. 1. The optimization directions of the two negative sample image features when optimizing the anchor image feature a are inconsistent, causing the optimization direction of the feature point a to change with the change of the negative sample image features during the model training process. In some extreme cases, different negative sample image features may optimize the anchor image feature a in opposite directions, causing a "tug-of-war" phenomenon, resulting in the model being unable to converge during the training phase.

Furthermore, the conventional triplet loss function only uses one negative sample image in a single optimization process. For example, the conventional triplet loss function based on the "hard example mining" strategy only uses the image that is most similar (i.e., the hardest image) to the anchor sample image as the negative sample image, and uses its corresponding negative sample image feature to calculate the loss value. This scheme tends to be affected by mislabeling. Specifically, since the conventional triplet loss function only considers the information of a negative sample image, the traditional triplet loss function will optimize the anchor image feature in the wrong direction if the negative sample image is an incorrectly labeled image (for example, the true class of the negative sample image is consistent with the class of the anchor image, but the label is wrong).

In summary, using the trained model for target identification may lead to identification errors. In view of this, the present disclosure improves the traditional triplet loss function, which can prevent the network model from optimizing in the wrong direction to a certain extent, thereby improving the robustness and accuracy of target identification. In order to illustrate the technical solution of the present disclosure, specific embodiments are provided below.

Figure 2:
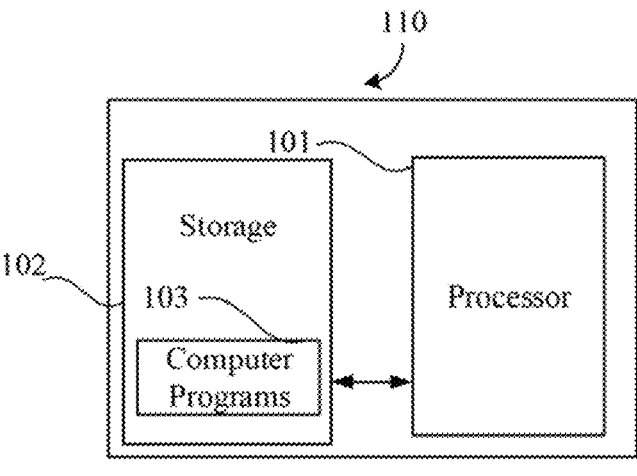
FIG. 2 is a schematic block diagram of a device according to one embodiment.

FIG. 2 shows a schematic block diagram of a device 110 according to one embodiment. The device 110 may include a processor 101, a storage 102, and one or more executable computer programs 103 that are stored in the storage 102. The storage 102 and the processor 101 are directly or indirectly electrically connected to each other to realize data transmission or interaction. For example, they can be electrically connected to each other through one or more communication buses or signal lines. The processor 101 performs corresponding operations by executing the executable computer programs 103 stored in the storage 102. When the processor 101 executes the computer programs 103, the steps in the embodiments of a target identification method, such as steps S201 to S203 in FIG. 3 and steps S301 to S305 in FIG. 4 are implemented.

The processor 101 may be an integrated circuit chip with signal processing capability. The processor 101 may be a central processing unit (CPU), a general-purpose processor, a digital signal processor (DSP), an application specific integrated circuit (ASIC), a field-programmable gate array (FPGA), a programmable logic device, a discrete gate, a transistor logic device, or a discrete hardware component. The general-purpose processor may be a microprocessor or any conventional processor or the like. The processor 101 can implement or execute the methods, steps, and logical blocks disclosed in the embodiments of the present disclosure.

The storage 102 may be, but not limited to, a random-access memory (RAM), a read only memory (ROM), a programmable read only memory (PROM), an erasable programmable read-only memory (EPROM), and an electrical erasable programmable read-only memory (EE-PROM). The storage 102 may be an internal storage unit of the device 110, such as a hard disk or a memory. The storage 102 may also be an external storage device of the device 110, such as a plug-in hard disk, a smart memory card (SMC), and a secure digital (SD) card, or any suitable flash cards. Furthermore, the storage 102 may also include both an internal storage unit and an external storage device. The storage 102 is to store computer programs, other programs, and data required by the device 110. The storage 102 can also be used to temporarily store data that have been output or is about to be output.

Figure 6:
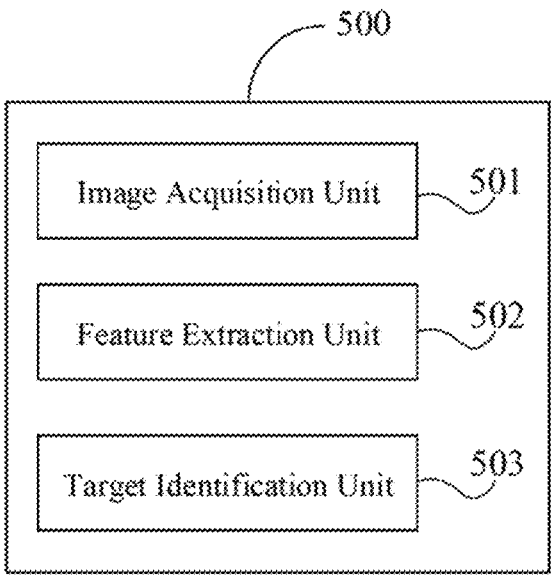
FIG. 6 is a schematic block diagram of a target identification device according to one embodiment.

Exemplarily, the one or more computer programs 103 may be divided into one or more modules/units, and the one or more modules/units are stored in the storage 102 and executable by the processor 101. The one or more modules/units may be a series of computer program instruction segments capable of performing specific functions, and the instruction segments are used to describe the execution process of the one or more computer programs 103 in the device 110. For example, the one or more computer programs 103 may be divided into an image acquisition unit 501, a feature extraction unit 502 and a target identification unit 503 as shown in FIG. 6.

It should be noted that the block diagram shown in FIG. 2 is only an example of the device 110. The device 110 may include more or fewer components than what is shown in FIG. 2, or have a different configuration than what is shown in FIG. 2. Each component shown in FIG. 2 may be implemented in hardware, software, or a combination thereof.

Figure 3:
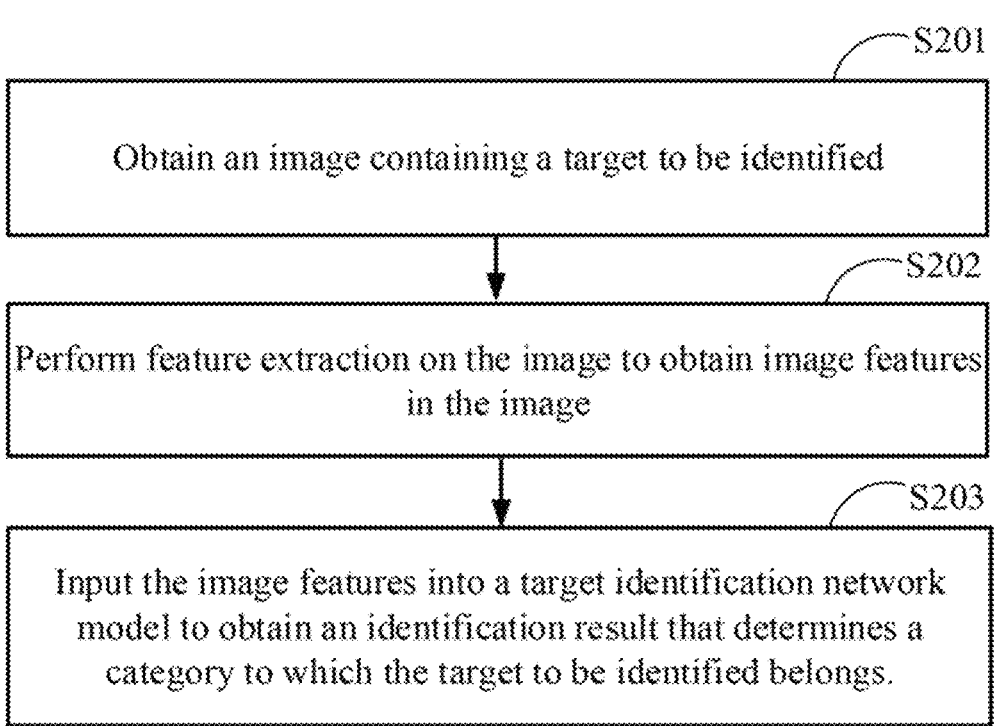
FIG. 3 is an exemplary flowchart of a target identification method according to one embodiment.

FIG. 3 is an exemplary flowchart of a target identification method according to one embodiment. As an example, but not a limitation, the method can be implemented by the device 110 and is suitable for situations where the accuracy of target identification needs to be improved. The device 110 can be a smartphone, a computer, a vehicle-mounted equipment, a monitoring equipment, or an intelligent device with a need for target identification. The method may include the following steps.

Step S201: Obtain an image containing a target to be identified.

The aforementioned target to be identified refers to the object requiring identification, and the image is the image obtained by capturing the target to be identified. It should be understood that the target to be identified can be a person, a vehicle, a pet, or any other object, and can be adjusted based on the requirements of the identification task.

In one embodiment, the device 110 can obtain the image in different manners. For example, the device 110 can photograph the target to be identified through a camera to obtain the image. Alternatively, the device 110 can download the image that needs to be identified from the Internet. The present disclosure does not impose any restrictions on this aspect.

Step S202: Perform feature extraction on the image to obtain image features in the image.

Image features refer to characteristics within the image, which can include various types of information such as pixel values, contours, textures, and other distinguishing elements present in the image. They can further include features of the target to be identified in the image, such as key feature points of the target to be identified.

It should be noted that the present disclosure does not impose restrictions on the method used for extracting image features. The device can employ various algorithms to extract image features from the image, such as the local binary patterns (LBP) feature extraction algorithm, histogram of oriented gradient (HOG) feature extraction algorithm, scale-invariant feature transform (SIFT) algorithm for keypoint extraction, feature extraction algorithms based on deep neural networks (e.g., ResNet), or other algorithms for extracting image features.

Step S203: Input the image features into a target identification network model to obtain an identification result that determines a class to which the target to be identified belongs.

The target identification network model is a network model used for target identification and classification of targets to be identified. The loss function of the target identification network model can be used to constrain the first distance and the second distance corresponding to each triplet in the plurality of triplets.

The first distance can represent the distance between the anchor image features and the positive sample image features within the same triplet. The second distance can represent the distance between the anchor image features and the negative sample image features of multiple classes within the same triplet. In another embodiment, the second distance represents a distance between the anchor image features and a class center mean of multiple classes within the same triplet.

In one embodiment, sample images refer to the images used to train the target identification network model. These sample images can include multiple batches. Each batch can include one or more triplets. Each triplet is a sample image group used for a single optimization. Specifically, each triplet may include anchor image features of the anchor sample image, positive sample image features of the positive sample image, and negative sample image features of negative sample images of multiple classes.

The anchor sample image can be any image among the sample images. The positive sample image can be a sample image of the same class as the anchor sample image. The negative sample image can be a sample image of a different class from the anchor sample image. The anchor image features, positive sample image features and negative sample image features are features extracted from the anchor sample image, positive sample image and negative sample image respectively.

In other words, the present disclosure can use multiple triplets for model training. Since the triplet used in a single optimization includes multiple classes of negative sample image features, the loss function needs to consider the distances between the anchor image features and the negative sample image features of multiple classes, achieving a balance between the number of classes and the number of images in the negative sample images.

More specifically, the loss values of the loss function of the target identification network model are positively correlated with the first distances and negatively correlated with the second distances.

It should be understood that the methods for acquiring the aforementioned sample images (anchor, positive, and negative sample images) and extracting their features (anchor image features, positive sample image features, and negative sample image features) can be inferred from the methods used to acquire the images containing the targets to be identified and extract their image features. This application does not elaborate further on this aspect.

In summary, by performing feature extraction on the image of the target to be identified, the image features in the image are obtained and then input into the target identification network model to obtain the identification result that determines the class to which the target to be identified belongs. The loss function of the target identification network model is to constrain the first distance and the second distance corresponding to each triplet in a number of triplets. The first distance represents the distance between the anchor image features and the positive sample image features within the same triplet. The second distance represents the distance between the anchor image features and the negative sample image features of multiple classes within the same triplet. In another embodiment, the second distance represents the distance between the anchor image features and a class center mean of multiple classes within the same triplet. That is to say, in a single optimization, the number of classes of negative sample images and the number of negative sample images are increased, and the impact of incorrect labels of negative sample images on the direction of model optimization is reduced. It can avoid situations where different optimizations, employing different negative sample images, result in optimizing towards conflicting directions. This enables the trained model to perform target identification more accurately and improves the accuracy of target identification.

Referring to FIG. 4, in one embodiment, the calculation process of the aforementioned loss function may include the following steps S301 to S305.

Step S301: Calculate a class center of each class based on sample image features of sample images in a batch, wherein the batch includes one or more of the triplets.

The class center can be the mean of all sample image features corresponding to a particular class. The device 110 can calculate the class center for each class based on the sample image features of each sample image in the batch and a class center calculation equation.

In one embodiment, the class center calculation equation is as follows:

$$f_i = \frac{1}{N_i} \sum_{k=1}^{N_i} f_i^k,$$

where $f_i$ represents the class center of the i-th class, $$f_i^k$$

represents sample image features of the k-th sample image of the i-th class in the batch, and $N_i$ represents a total number of sample images of the i-th class in the batch, that is, the total number of sample image features of the i-th class.

Step S302: Calculate target negative sample image features of each of the triplets according to the class center of each class.

The target negative sample image features can represent the negative sample image features of all the classes in one triplet.

In one embodiment, the device 110 can obtain the weight value corresponding to each class in each triplet, and perform weighted averaging on the class center of the class corresponding to the negative sample image in each of the triplets, according to the weight value corresponding to each class in each of the triplets, to obtain the target negative sample image feature corresponding to the triplet.

In one embodiment, the device 110 can calculate a third distance between the anchor image features and the class center of each class corresponding to the negative sample image in each of the triplets, and determine the weight value of the class corresponding to the negative sample image in each of the triplets according to the third distance. The weight value is inversely proportional to the third distance.

In one embodiment, the device 110 can calculate the target negative sample image features according to the following feature calculation equation:

$$f_i^n = \frac{1}{C-1}\sum_{c=1,c \neq c_i^a}^{C-1} w_c f_c,$$

where $$F_i^n$$

represents the target negative sample image features of the i-th triplet, and C is the total number of classes contained in each triplet and $$c_i^a$$

indicates the class index with which the anchor image in the i-th triplet is associated. In one embodiment, each triplet can include negative sample images of all classes in the batch. In this case, C is the total number of the classes included in the batch. $w_c$ is the weight of the class c and can be expressed as follows:

$$w_c = 1 - \frac{f_c f_i^a}{\|f_c\|\|f_a\|},$$

$f_c$ represents the class center of the c-th class, $$f_i^a$$

represents the anchor image features of the i-th triplet, and $\|\ \|$ represents the norm.

Using the aforementioned weighted average method allows consideration of class centers that are relatively closer to the sample image features of the anchor sample image during optimization.

Step S303: Calculate the first distance corresponding to each of the triplets according to the anchor image features and positive sample image feature of each of the triplets.

Step S304: Calculate the second distance corresponding to each of the triplets according to the anchor image features and the target negative sample image feature of each of the triplets.

Step S305: Determine the loss values of the loss function according to the first distance corresponding to each of the triplets and the second distance corresponding to each of the triplets.

Specifically, using the anchor image features $$f_i^a$$

of the i-th triplet and the positive sample image features $$f_i^p$$

in the triplet, the first distance $$D(f_i^a, f_i^p)$$

corresponding to the triplet can be calculated. For example, the first distance $$D(f_i^a, f_i^p)$$

can be obtained by making a difference between $$f_i^a \text{ and } f_i^p.$$

Similarly, using the reference image features $$f_i^a$$

of the i-th triplet and the target negative sample image features $$F_i^n$$

of the triplet, the second distance $$D(f_i^a, F_i^n)$$

corresponding to each triplet can be calculated. For example, the second distance $$D(f_i^a, F_i^n)$$

can be obtained by making a difference between $$f_i^a \text{ and } F_i^n.$$

At this point, the aforementioned loss function is expressed as follows:

$$L_{eq\_triplet} = \frac{1}{N_{tp}} \sum_{i=1}^{N_{tp}} \{D(f_i^a, f_i^p) - D(f_i^a, F_i^n) + \alpha\}_+,$$

where $N_{tp}$ represents the number of the triplets in a batch, $$f_i^a$$

represents the anchor image features of the i-th triplet, $$f_i^p$$

represents the positive sample image features of the i-th triplet, $$F_i^n$$

represents the target negative sample image features obtained based on the negative sample image features of the i-th triplet, $\alpha$ is a preset distance threshold, $\alpha \geq 0$ and its value can be adjusted according to actual circumstances, $\{x\}_+$ means taking a maximum value between x and 0, that is, $\{x\}_+ = \max(x, 0)$, and $D(x, y)$ represents a distance between x and y.

Figure 5:
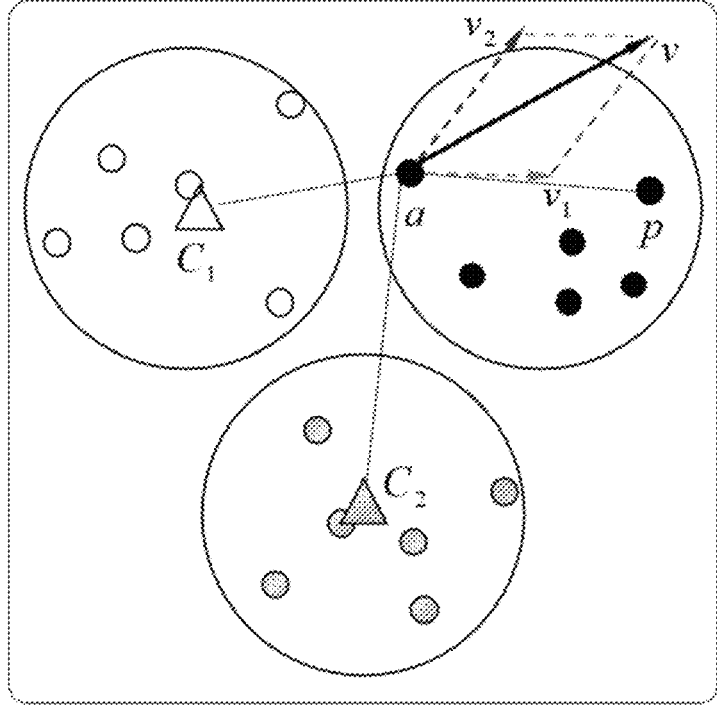
FIG. 5 is a schematic diagram of model training based on the loss function according to one embodiment.

Specifically, the loss function proposed in the present disclosure considers information from negative sample images of different classes when determining the optimization direction of the anchor image features. Referring to FIG. 5, circles filled with solid colors, circles filled with diagonal lines, and hollow circles respectively represent sample image features of targets of different classes. Among them, a and p represent the anchor image features and positive sample image features respectively. $C_1$ and $C_2$ represent the class centers of different classes, and $v_1$ and $v_2$ respectively represent the optimization directions of anchor image feature a. When determining the optimization direction of the anchor image feature a, the optimization directions provided by negative sample image features from two different classes, namely v_1 and v_2 shown in FIG. 4, are considered. In order to reduce the impact of wrong labels, the loss function proposed in the present disclosure imposes a balancing strategy on the number of negative sample images. That is, when determining the optimization direction of the anchor image feature points for the class corresponding to the negative sample image features, not only one image of this class is considered, but all negative sample images of this class in the batch are considered. As shown in FIG. 5, the optimization directions (i.e., $v_1$ and $v_2$) provided by the negative sample images are determined by the class center (the mean of all negative sample image features) of the class corresponding to the negative sample images. Therefore, the trained target identification network model can still classify targets well, which improves the accuracy and robustness of target identification.

Based on this loss function, the device 110 can obtain the sample images of the sample target, and determine multiple triplets based on the sample images. With a goal of minimizing the loss function, the identification network model to be trained is trained iteratively until the loss value of the loss function is less than or equal to a preset loss value threshold, or until a number of iterations of the identification network model to be trained is greater than or equal to a preset threshold, thereby obtaining the target identification network model.

More specifically, for the sample images $\{I_1, I_2, \ldots, I_p\}$, sample image features $(f_1, f_2, \ldots, f^p)$ can be extracted, where p represents the total number of sample images, and $I_p$ represents the p-th sample image, and $f^p$ represents the sample image characteristics of the p-th sample image. Several images are selected from them to form a batch. The batch contains sample images of each class, and several triplets can be formed based on these classes.

The anchor image features of the triplets in the batch are input into the identification network model to be trained to obtain their predicted values. The loss value of the loss function $L_{eq\_triplet}$ is then calculated according to the predicted values, positive sample image features, and negative sample image features. If the convergence condition of the identification network model to be trained is that the loss value is less than or equal to the loss value threshold, the model parameters of the identification network model to be trained are adjusted when the loss value is greater than the loss value threshold. Then, a new batch is used to train the identification network model to be trained until the loss value is less than or equal to the loss value threshold, thereby obtaining the target identification network model. If the convergence condition of the identification network model to be trained is that the number of iterations is greater than or equal to a preset threshold, the model parameters of the identification network model to be trained are adjusted when the number of iterations is less than the preset threshold. Then, a new batch is used to train the identification network model to be trained until the number of iterations is greater than or equal to the preset threshold, thereby obtaining the target identification network model. Both the preset threshold and the loss value threshold can be adjusted according to actual situations.

After obtaining the target identification network model, the device 110 can use it to perform target identification. This target identification method can be applied to fields such as person re-identification and vehicle identification, which is not limited by the present disclosure.

The target recognition method of the present disclosure uses a triplet loss function based on a balanced strategy. This loss function applies a balancing policy from two perspectives: the number of classes of negative sample images and the number of images, which can alleviate the issues of unstable optimization direction and susceptibility to incorrect labels that are common in conventional triplet loss functions. As a result, the method can enhance the quality of features extracted by the model and improve the accuracy of target identification.

It should be understood that sequence numbers of the foregoing processes do not mean particular execution sequences. The execution sequences of the processes should be determined based on functions and internal logic of the processes, and should not be construed as any limitation on the implementation processes of the embodiments of the present disclosure.

Referring to FIG. 6, in one embodiment, a target identification device 500 may include an image acquisition unit 501, a feature extraction unit 502 and a target identification unit 503. The image acquisition unit 501 is to obtain an image containing a target to be identified. The feature extraction unit 502 is to perform feature extraction on the image to obtain image features in the image. The target identification unit 503 is to input the image features into a target identification network model to obtain an identification result that determines a class to which the target to be identified belongs. The target recognition network model includes a loss function that is to constrain a first distance corresponding to each triplet in multiple triplets and a second distance corresponding to each triplet in the multiple triplets. The first distance represents a distance between anchor image features and positive sample image features in each triplet in the triplets, and the second distance represents a distance between the anchor image features and a class center mean of multiple classes in each triplet in the triplets.

In one embodiment, the target identification device 500 may further include a model training unit that is to: calculate a class center of each class based on sample image features of sample images in a batch, wherein the batch includes one or more of the triplets, calculate target negative sample image features of each of the triplets according to the class center of each class; calculate the first distance corresponding to each of the triplets according to the anchor image features and positive sample image feature of each of the triplets; calculate the second distance corresponding to each of the triplets according to the anchor image features and the target negative sample image feature of each of the triplets; and determine the loss values of the loss function according to the first distance corresponding to each of the triplets and the second distance corresponding to each of the triplets.

In one embodiment, the model training unit is to: obtain a weight value corresponding to each class in each of the triplets; and perform weighted averaging on the class center of the class corresponding to the negative sample image in each of the triplets, according to the weight value corresponding to each class in each of the triplets, to obtain the target negative sample image feature corresponding to the triplet.

In one embodiment, the model training unit is to: calculate a third distance between the anchor image features and the class center of each class corresponding to the negative sample image in each of the triplets; and determine the weight value of the class corresponding to the negative sample image in each of the triplets according to the third distance. The weight value is inversely proportional to the third distance.

In one embodiment, the model training unit is to calculate the class center of each class based on the sample image features of each sample image in the batch and a class center calculation equation. The class center calculation equation is as follows:

$$f_i = \frac{1}{N_i} \sum_{k=1}^{N_i} f_i^k,$$

where $f_i$ represents the class center of an i-th class, $$f_i^k$$

represents sample image features of a k-th sample image of the i-th class in the batch, and $N_i$ represents a total number of sample images of the i-th class in the batch.

In one embodiment, the loss function is expressed as follows:

$$L_{eq\_triplet} = \frac{1}{N_{tp}} \sum_{i=1}^{N_{tp}} \{D(f_i^a, f_i^p) - D(f_i^a, F_i^n) + \alpha\}_+,$$

$N_{tp}$ represents a number of the triplets, $$f_i^a$$

represents the anchor image features of an i-th triplet, $$f_i^p$$

represents the positive sample image features of the i-th triplet, $$F_i^n$$

represents the target negative sample image features obtained based on the negative sample image features of the i-th triplet, $\alpha$ is a preset distance threshold, $\{x\}_+$ means taking a maximum value between x and 0, and $D(x, y)$ represents a distance between x and y.

In one embodiment, the model training unit is to: determine the triplets based on the sample images; and with a goal of minimizing the loss function, train the identification network model to be trained iteratively until the loss value of the loss function is less than or equal to a preset loss value threshold, or until a number of iterations of the identification network model to be trained is greater than or equal to a preset threshold, thereby obtaining the target identification network model.

It should be noted that content such as information exchange between the modules/units and the execution processes thereof is based on the same idea as the method embodiments of the present disclosure, and produces the same technical effects as the method embodiments of the present disclosure. For the specific content, refer to the foregoing description in the method embodiments of the present disclosure. Details are not described herein again.

Another aspect of the present disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It should be understood that the disclosed device and method can also be implemented in other manners. The device embodiments described above are merely illustrative. For example, the flowcharts and block diagrams in the accompanying drawings illustrate the architecture, functionality and operation of possible implementations of the device, method and computer program product according to embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition, functional modules in the embodiments of the present disclosure may be integrated into one independent part, or each of the modules may be independent, or two or more modules may be integrated into one independent part. in addition, functional modules in the embodiments of the present disclosure may be integrated into one independent part, or each of the modules may exist alone, or two or more modules may be integrated into one independent part. When the functions are implemented in the form of a software functional unit and sold or used as an independent product, the functions may be stored in a computer-readable storage medium. Based on such an understanding, the technical solutions in the present disclosure essentially, or the part contributing to the prior art, or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

A person skilled in the art can clearly understand that for the purpose of convenient and brief description, for specific working processes of the device, modules and units described above, reference may be made to corresponding processes in the embodiments of the foregoing method, which are not repeated herein.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random-access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented target identification method, the method comprising:

obtaining an image containing a target to be identified;

performing feature extraction on the image to obtain image features in the image; and inputting the image features into a target identification network model to obtain an identification result that determines a class to which the target to be identified belongs, wherein the target recognition network model comprises a loss function that is configured to constrain a first distance corresponding to each triplet in a plurality of triplets and a second distance corresponding to each triplet in the plurality of triplets, the first distance represents a distance between anchor image features and positive sample image features in each triplet in the plurality of triplets, and the second distance represents a distance between the anchor image features and a class center mean of a plurality of classes in each triplet in the plurality of triplets.

2. The method of claim 1, wherein a calculation process of loss values of the loss function comprises:

calculating a class center of each class based on sample image features of sample images in a batch, wherein the batch includes one or more of the triplets;

calculating target negative sample image features of each of the triplets according to the class center of each class;

calculating the first distance corresponding to each of the triplets according to the anchor image features and positive sample image feature of each of the triplets;

calculating the second distance corresponding to each of the triplets according to the anchor image features and the target negative sample image feature of each of the triplets; and determining the loss values of the loss function according to the first distance corresponding to each of the triplets and the second distance corresponding to each of the triplets.

3. The method of claim 2, wherein calculating target negative sample image features of each of the triplets according to the class center of each class comprises:

obtaining a weight value corresponding to each class in each of the triplets;

performing weighted averaging on the class center of the class corresponding to the negative sample image in each of the triplets, according to the weight value corresponding to each class in each of the triplets, to obtain the target negative sample image feature corresponding to the triplet.

4. The method of claim 3, wherein obtaining the weight value corresponding to each class in each of the triplets comprises:

calculating a third distance between the anchor image features and the class center of each class corresponding to the negative sample image in each of the triplets; and determining the weight value of the class corresponding to the negative sample image in each of the triplets according to the third distance, wherein the weight value is inversely proportional to the third distance.

5. The method of claim 2, wherein the class center of each class is calculated according to the following equation:

$$f_i = \frac{1}{N_i} \sum\nolimits_{k=1}^{N_i} f_i^k,$$

where $f_i$ represents the class center of an i-th class, $$f_i^k$$

represents sample image features of a k-th sample image of the i-th class in the batch, and $N_i$ represents a total number of sample images of the i-th class in the batch.

6. The method of claim 1, wherein the loss function is expressed as follows:

$$L_{eq\_triplet} = \frac{1}{N_{tp}} \sum\nolimits_{i=1}^{N_{tp}} \{D(f_i^a, f_i^p) - D(f_i^a, F_i^n) + \alpha\}_+,$$

$N_{tp}$ represents a number of the triplets, $$f_i^a$$

represents the anchor image features of an i-th triplet, $$f_i^p$$

represents the positive sample image features of the i-th triplet, $$F_i^n$$

represents the target negative sample image features obtained based on the negative sample image features of the i-th triplet, $$F_i^n = \frac{1}{C-1}\sum_{c=1,c\neq c_i^a}^{C-1} w_c f_c,$$

C is a total number of classes contained in each triplet, $$c_i^a$$

indicates a class index with which the anchor image in the i-th triplet is associated, $w_c$ is a weight of a class c and is expressed as follows:

$$w_c = 1 - \frac{f_c f_i^a}{\|f_c\|\|f_i^a\|},$$

represents the class center of a c-th class, $\|\ \|$ represents the norm, $\alpha$ is a preset distance threshold, $\{x\}_+$ means taking a maximum value between x and 0, and D(x, y) represents a distance between x and y.

7. The method of claim 1, wherein a process of training the target identification network model comprises:
    obtaining a plurality of sample images;
    determining the plurality of the triplets based on the sample images; and
    with a goal of minimizing the loss function, training the identification network model to be trained iteratively until the loss value of the loss function is less than or equal to a preset loss value threshold, or until a number of iterations of the identification network model to be trained is greater than or equal to a preset threshold, thereby obtaining the target identification network model.

8. A device comprising:
    one or more processors; and
    a memory coupled to the one or more processors, the memory storing programs that, when executed by the one or more processors, cause performance of operations comprising:
    obtaining an image containing a target to be identified;
    performing feature extraction on the image to obtain image features in the image; and
    inputting the image features into a target identification network model to obtain an identification result that determines a class to which the target to be identified belongs, wherein the target recognition network model comprises a loss function that is configured to constrain a first distance corresponding to each triplet in a plurality of triplets and a second distance corresponding to each triplet in the plurality of triplets, the first distance represents a distance between anchor image features and positive sample image features in each triplet in the plurality of triplets, and the second distance represents a distance between the anchor image features and a class center mean of a plurality of classes in each triplet in the plurality of triplets.

9. The device of claim 8, wherein a calculation process of loss values of the loss function comprises:
    calculating a class center of each class based on sample image features of sample images in a batch, wherein the batch includes one or more of the triplets;
    calculating target negative sample image features of each of the triplets according to the class center of each class;
    calculating the first distance corresponding to each of the triplets according to the anchor image features and positive sample image feature of each of the triplets;
    calculating the second distance corresponding to each of the triplets according to the anchor image features and the target negative sample image feature of each of the triplets; and
    determining the loss values of the loss function according to the first distance corresponding to each of the triplets and the second distance corresponding to each of the triplets.

10. The device of claim 9, wherein calculating target negative sample image features of each of the triplets according to the class center of each class comprises:
    obtaining a weight value corresponding to each class in each of the triplets;
    performing weighted averaging on the class center of the class corresponding to the negative sample image in each of the triplets, according to the weight value corresponding to each class in each of the triplets, to obtain the target negative sample image feature corresponding to the triplet.

11. The device of claim 10, wherein obtaining the weight value corresponding to each class in each of the triplets comprises:
    calculating a third distance between the anchor image features and the class center of each class corresponding to the negative sample image in each of the triplets; and
    determining the weight value of the class corresponding to the negative sample image in each of the triplets according to the third distance, wherein the weight value is inversely proportional to the third distance.

12. The device of claim 9, wherein the class center of each class is calculated according to the following equation:

$$f_i = \frac{1}{N_i}\sum_{k=1}^{N_i} f_i^k,$$

where $f_i$ represents the class center of an i-th class, $$f_i^k$$

represents sample image features of a k-th sample image of the i-th class in the batch, and $N_i$ represents a total number of sample images of the i-th class in the batch.

13. The device of claim 8, wherein the loss function is expressed as follows:

$$L_{eq\_triplet} = \frac{1}{N_{tp}}\sum_{i=1}^{N_{tp}} \{D(f_i^a, f_i^p) - D(f_i^a, F_i^n) + \alpha\}_+,$$

$N_{tp}$ represents a number of the triplets, $$f_i^a$$

represents the anchor image features of an i-th triplet, $$f_i^p$$

represents the positive sample image features of the i-th triplet, $$F_i^n$$

represents the target negative sample image features obtained based on the negative sample image features of the i-th triplet, $$F_i^n = \frac{1}{C-1} \sum_{c=1, c \neq c_i^a}^{C-1} w_c f_c,$$

C is a total number of classes contained in each triplet, $$c_i^a$$

indicates a class index with which the anchor image in the i-th triplet is associated, $w_c$ is a weight of a class c and is expressed as follows:

$$w_c = 1 - \frac{f_c f_i^a}{\|f_c\| \|f_i^a\|},$$

$f_c$ represents the class center of a c-th class, $\| \|$ represents the norm, $\alpha$ is a preset distance threshold, $\{x\}_+$ means taking a maximum value between x and 0, and D(x, y) represents a distance between x and y.

14. The device of claim 8, wherein a process of training the target identification network model comprises:
  obtaining a plurality of sample images;
  determining the plurality of the triplets based on the sample images; and
  with a goal of minimizing the loss function, training the identification network model to be trained iteratively until the loss value of the loss function is less than or equal to a preset loss value threshold, or until a number of iterations of the identification network model to be trained is greater than or equal to a preset threshold, thereby obtaining the target identification network model.

15. A non-transitory computer-readable storage medium storing instructions that, when executed by at least one processor of a device, cause the at least one processor to perform a method, the method comprising:
  obtaining an image containing a target to be identified;
  performing feature extraction on the image to obtain image features in the image; and
  inputting the image features into a target identification network model to obtain an identification result that determines a class to which the target to be identified belongs, wherein the target recognition network model comprises a loss function that is configured to constrain a first distance corresponding to each triplet in a plurality of triplets and a second distance corresponding to each triplet in the plurality of triplets, the first distance represents a distance between anchor image features and positive sample image features in each triplet in the plurality of triplets, and the second distance represents a distance between the anchor image features and a class center mean of a plurality of classes in each triplet in the plurality of triplets;
  wherein a calculation process of loss values of the loss function comprises:
    calculating a class center of each class based on sample image features of sample images in a batch, wherein the batch includes one or more of the triplets;
    calculating target negative sample image features of each of the triplets according to the class center of each class;
    calculating the first distance corresponding to each of the triplets according to the anchor image features and positive sample image feature of each of the triplets;
    calculating the second distance corresponding to each of the triplets according to the anchor image features and the target negative sample image feature of each of the triplets; and
    determining the loss values of the loss function according to the first distance corresponding to each of the triplets and the second distance corresponding to each of the triplets;
  wherein calculating target negative sample image features of each of the triplets according to the class center of each class comprises:
    obtaining a weight value corresponding to each class in each of the triplets;
    performing weighted averaging on the class center of the class corresponding to the negative sample image in each of the triplets, according to the weight value corresponding to each class in each of the triplets, to obtain the target negative sample image feature corresponding to the triplet; and
  wherein obtaining the weight value corresponding to each class in each of the triplets comprises:
    calculating a third distance between the anchor image features and the class center of each class corresponding to the negative sample image in each of the triplets; and
    determining the weight value of the class corresponding to the negative sample image in each of the triplets according to the third distance, wherein the weight value is inversely proportional to the third distance.

16. The non-transitory computer-readable storage medium of claim 15, wherein the class center of each class is calculated according to the following equation:

$$f_i = \frac{1}{N_i} \sum_{k=1}^{N_i} f_i^k,$$

where $f_i$ represents the class center of an i-th class, $$f_i^k$$

represents sample image features of a k-th sample image of the i-th class in the batch, and $N_i$ represents a total number of sample images of the i-th class in the batch.

17. The non-transitory computer-readable storage medium of claim 15, wherein the loss function is expressed as follows:

$$L_{eq\_triplet} = \frac{1}{N_{tp}} \sum_{i=1}^{N_{tp}} \{D(f_i^a, f_i^p) - D(f_i^a, F_i^n) + \alpha\}_+,$$

$N_{tp}$ represents a number of the triplets, $$f_i^a$$

represents the anchor image features of an i-th triplet, $$f_i^p$$

at represents the positive sample image features of the i-th triplet, $$F_i^n$$

represents the target negative sample image features obtained based on the negative sample image features of the i-th triplet, $$F_i^n = \frac{1}{C-1} \sum_{c=1, c \neq c_i^a}^{C-1} w_c f_c,$$

C is a total number of classes contained in each triplet, $$c_i^a$$

indicates a class index with which the anchor image in the i-th triplet is associated, $w_c$ is a weight of a class c and is expressed as follows:

$$w_c = 1 - \frac{f_c f_i^a}{\|f_c\| \|f_i^a\|},$$

$f_c$ represents the class center of a c-th class, $\|\ \|$ represents the norm, $\alpha$ is a preset distance threshold, $\{x\}_+$ means taking a maximum value between x and 0, and D(x, y) represents a distance between x and y.

18. The non-transitory computer-readable storage medium of claim 15, wherein a process of training the target identification network model comprises:

obtaining a plurality of sample images;

determining the plurality of the triplets based on the sample images; and with a goal of minimizing the loss function, training the identification network model to be trained iteratively until the loss value of the loss function is less than or equal to a preset loss value threshold, or until a number of iterations of the identification network model to be trained is greater than or equal to a preset threshold, thereby obtaining the target identification network model.

19. The non-transitory computer-readable storage medium of claim 18, wherein the sample images include multiple batches, and each batch of the sample images includes one or more triplets;

each triplet in each batch of the sample images includes anchor image features of an anchor sample image, positive sample image features of a positive sample image, and negative sample image features of negative sample images of multiple classes; and the anchor sample image is any image among the sample images, the positive sample image is a sample image of the same class as the anchor sample image, and the negative sample image is a sample image of a different class from the anchor sample image.

20. The non-transitory computer-readable storage medium of claim 15, wherein the image features include: pixel values, contours and textures in the image, or key feature points of the target to be identified in the image.

* * * * *